United States Patent [19]

Kobayashi et al.

[11] 4,395,287
[45] Jul. 26, 1983

[54] LIQUID RECORDING MATERIAL

[75] Inventors: Masatsune Kobayashi, Yokohama; Seiko Matsumoto, Atsugi; Masahiro Haruta, Funabashi; Tokuya Ohta, Yokohama, all of Japan

[73] Assignee: Canon Kabushiki Kaisha, Tokyo, Japan

[21] Appl. No.: 323,881

[22] Filed: Nov. 23, 1981

[30] Foreign Application Priority Data

Dec. 1, 1980 [JP] Japan .................................. 55-169862
Dec. 1, 1980 [JP] Japan .................................. 55-169863
Dec. 1, 1980 [JP] Japan .................................. 55-169864

[51] Int. Cl.³ ............................................ C09D 11/02
[52] U.S. Cl. ........................................ 106/20; 106/22
[58] Field of Search ................................... 106/22, 20; 260/DIG. 38

[56] References Cited

U.S. PATENT DOCUMENTS 3,846,141 11/1974 Ostergren et al. ..................... 106/22

Primary Examiner—Harold D. Anderson
Assistant Examiner—Amelia B. Yarbrough
Attorney, Agent, or Firm—Fitzpatrick, Cella, Harper & Scinto

[57] ABSTRACT

A liquid recording material comprises a recording agent for forming a recording image and a liquid vehicle for dissolving or dispersing said recording agent therein and is characterized in that a polyalkylene glycol having an average molecular weight of 150 to 350 (A component) and a polyalkylene glycol having an average molecular weight of 400 to 750 (B component) are incorporated in combination in said material.

13 Claims, 5 Drawing Figures

LIQUID RECORDING MATERIAL

BACKGROUND OF THE INVENTION

1. Field of the Invention

This invention relates to a liquid recording material to be used for various writing implements or a so called ink-jet recording device, particularly to a liquid recording material which is suitable for use in the latter ink-jet recording device.

2. Description of the Prior Art

There have herertofore been used liquid recording materials (hereinafter referred to as "ink"), containing various dyes dissolved in water or other organic solvents, for use in performing writing on a material to be recorded such as paper with a writing implement (e.g. fountain pen, felt pen, etc.).

Also, in a so called ink-jet recording system, wherein recording is effected by discharging a liquid in a recording head through a discharge orifice by the force of oscillation of a piezoelectric oscillator or electrostatic attraction by application of a high voltage, it is known to use a composition having various dyes dissolved in water or an organic solvent. But, as compared with inks for writing implements such as fountain pen or felt pen, more severe conditions in various aspects of characteristics are required for an ink for an ink-jet recording system.

The ink-jet recording method enables high speed recording or color recording on a plain paper without specific fixing treatment with little emission of noise, and various systems therefor have actively been developed.

In such an ink-jet recording method, droplets of ink are generated based on various principles and deposited on a material to effect recording. And, such an ink comprises as essential components a recording agent (for which a dye or a pigment is used) and a liquid vehicle (for which water, various organic solvents or mixtures thereof are used), optionally containing various additives.

In this connection, the ink-jet recording method may be classified into various systems depending on the method for generation of ink droplets and the method for controlling the flight direction of ink droplets. One example is shown in FIG. 1.

Namely, the device as shown in FIG. 1 performs recording by giving a recording signal to the recording head section having a piezoelectric oscillator and generating ink droplets corresponding to said signal. In FIG. 1, numeral 1 is a recording head, having a piezooscillator 2a, a vibration board 2b, an inlet 3 for ink, a liquid chamber 4 in head and discharge outlet (discharge orifice) 5. Into the liquid chamber 4, an ink 7 stored in a storage tank 6 is introduced through a supplying pipe 8. In some cases, somewhere along the supplying pipe 8, there may also be provided an intermediate treatment means 9 such as a pump or a filter. And, on the piezoelectric oscillator 2a, a signal converted to a pulse from the recording signal S by means of a signal treating means (e.g. pulse convertor) 10 is applied, whereby a pressure change is incurred on the ink in the liquid chamber 4. As a result, the ink 7 is discharged as droplets 11 through the discharge orifice 5 thereby to effect recording on the surface of a material to be recorded 12.

Other than the device as described above, various types of devices are known. For example, as shown in FIG. 2, there is a modification of the device as shown in FIG. 1, wherein the liquid chamber 4 is shaped in a nozzle and a cylindrical piezoelectric oscillator is arranged around the outer peripheral portion thereof (the mechanism for generation of ink droplets is essentially the same as in the device as shown in FIG. 1). There is also known another device in which charged droplets are continuously generated and a part of said droplets are used for recording, or alternatively a device in which heat energy corresponding to the recording signal is given to the ink in the chamber of recording head, and liquid droplets are formed by said energy.

An embodiment of such a device is shown in FIG. 3A, FIG. 3B and FIG. 4.

The head 13 can be obtained by bonding a plate of glass, ceramics or plastic having a channel 14 for passing ink to a heat generating head 15 to be used for heat sensitive recording (in the drawing, a thin film head is shown, but the head is not limited thereto). The head 15 is constituted of a protective film 16 formed of silicon oxide, etc., aluminum electrodes 17-1, 17-2, a heat generating resistor layer 18 formed of nickel-chromium, etc., a heat accumulating layer 19 and a substrate with good heat dissipation such as alumina, etc.

The ink 21 comes up to the discharge orifice 22, and forms a meniscus 23 by the pressure P.

Now, on application of an electric signal across the electrodes 17-1 and 17-2, heat generation occurs abruptly at the portion indicated by n in the heat generating head 15 to form bubbles of the ink contacted at said portion. By the pressure of the bubbles, the meniscus 23 is protruded to discharge the ink 21 which flights through the orifice 22 as small droplets 24 toward the material to be recorded 25. In FIG. 4, there is shown an exterior view of a multi-head in which a number of heads as shown in FIG. 3A are arranged. Said multi-head is prepared by bonding a glass plate 27 having a multi-channel 26 to a heat generating head 28 similar to that described with reference to FIG. 3A.

As described above, among the devices defined comprehensively for effecting recording by flight of ink droplets, there are included various methods for generation of ink droplets and for controlling the flight direction of ink droplets. Therefore, for the purpose of performing good recording, the ink to be employed is required to have physical property values such as viscosity, surface tension and specific resistivity corresponding to the method for generation of ink droplets or the method for controlling the flight direction of ink droplets. And, in any of the systems, the ink employed is required to form no solid by vaporization of the liquid vehicle or chemical changes of the constituents during a long term storage or intermission of recording. Generally speaking, the discharge orifice in a ink-jet system recording device is a minute hole (having generally a diameter of some 10 microns) and therefore clogging may be caused by generation of solids and sometimes no ink droplet can be discharged.

Even if cessation of discharging does not occur, generation of solids will cause deleterious affects on generation of uniform ink droplets or stable flight of ink droplets, whereby recording performance, discharging stability, discharging response or continuous recordability may sometimes be lowered. Alternatively, when the constituents of ink undergo chemical changes, the physical properties adjusted to desired values at the time of preparation are changed, whereby recording performance, discharging stability or discharging response may also sometimes be lowered. Thus, it would be very desirable to have a liquid vehicle component difficulty vaporized, a chemically stable recording agent or a combination of a liquid vehicle and a recording agent free from the drawback as mentioned above.

Furthermore, the recorded image is also required to be sufficiently high in contrast and clear. Generally speaking, the inks of prior art tend to cause clogging of the discharge orifice, when the contrast of the recorded image is intended to be improved by increase of the content of a recording agent. Accordingly, it is earnestly desired to have a recording agent which is highly soluble in a liquid vehicle and has a clear tone.

In addition to the above characteristics, it is also required for the ink to be capable of recording without restriction as to the material to be recorded, to be high in fixing speed, to give an image excellent in water resistance, light resistance, friction resistance and resolution, and to be free from odor.

In view of the above points, there have been made various proposals concerning inks, but substantially no practical ink satisfying all of the above conditions has yet been obtained.

SUMMARY OF THE INVENTION

The object of the present invention is to provide an ink which satisfies all of the above conditions.

That is, the primary object of the present invention is to provide an ink excellent in discharging stability, discharging response and continuous recordability.

Another object of the present invention is to provide an ink capable of being easily endowed with appropriate physical property values.

Another object of the present invention is to provide an ink which will hardly generate solids during storage period or intermission of recording operation.

Still another object of the present invention is to provide an ink which can be broadened in latitude of selection of its constituents and excellent in general purpose utility and practical applicablity.

According to the present invention, there is provided a liquid recording material comprising a recording agent for forming a recording image and a liquid vehicle for dissolving or dispersing said recording agent therein, being characterized in that a polyalkylene glycol having an average molecular weight of 150 to 350 (A component) and a polyalkylene glycol having an average molecular weight of 400 to 750 (B component) are incorporated in combination in said material.

DETAILED DESCRIPTION OF THE PREFERRED EMBODIMENTS

Figure 1:
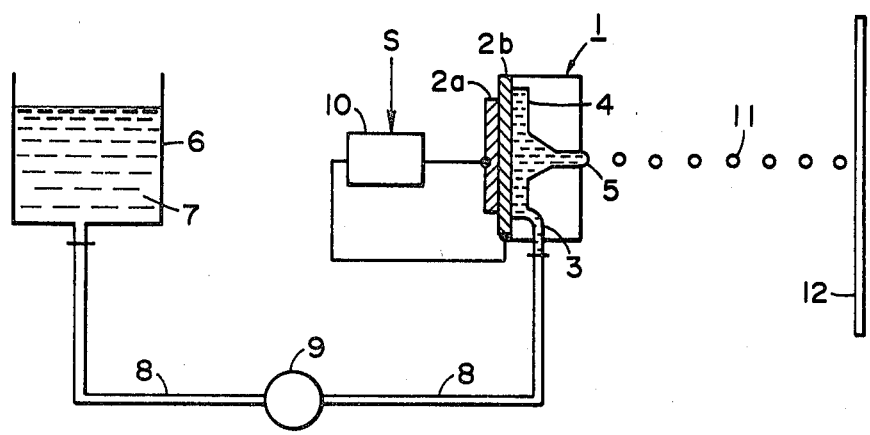
FIG. 1 and FIG. 2 are schematic drawings for illustration of one embodiment of ink-jet recording device of the prior art, respectively.
Figure 2:
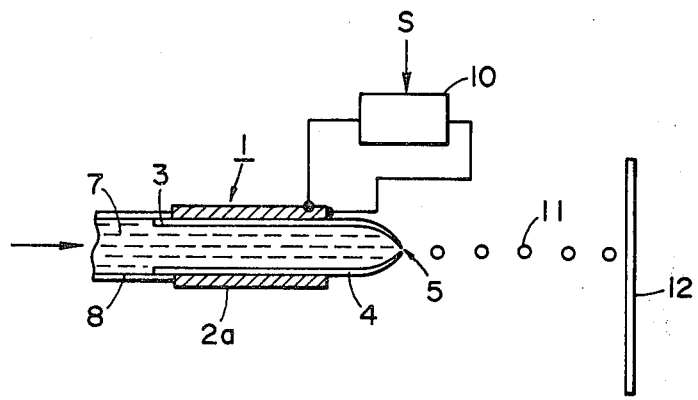
Figure 3A:
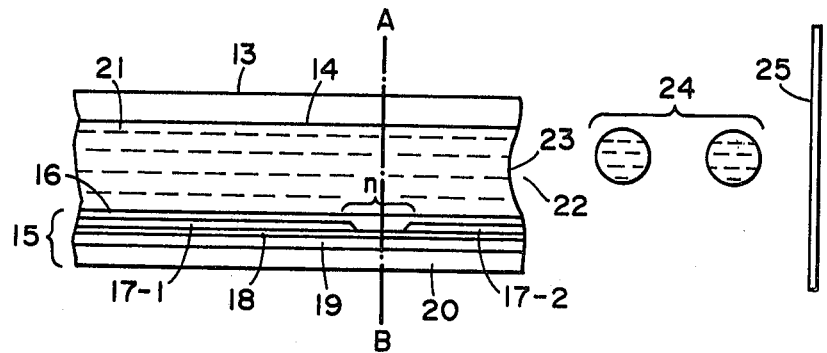
FIG. 3A and FIG. 3B are longitudinal sectional view and lateral sectional view, respectively, of one embodiment of ink-jet head of the prior art.
Figure 3B:
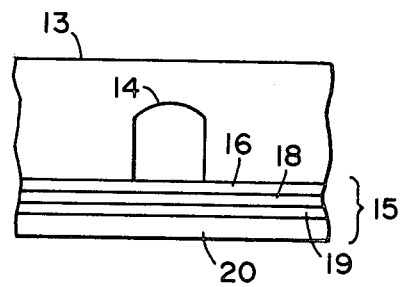

When a polyalkylene glycol, above all a combination of a polyalkylene glycol having an average molecular weight of 150 to 350 (A component) and a polyalkylene glycol having an average molecular weight of 400 to 750 (B component) is contained as an involatile liquid vehicle in such an ink, not only the storability and general purpose utility of the ink or maintenance of the device are excellent in a wide temperature range of low temperature to high temperature, but also good results can be obtained in discharging stability, discharging response and continuous recordability for a long time. That is, with the use of a polyalkylene glycol having an average molecular weight of 400 to 750 alone, while it is advantageously difficultly vaporized because of its very low vapor pressure, it will be on the other hand disadvantageously solidified due to its solidifying point around normal temperature, when the environmental temperature is lowered. In contrast, a polyalkylene glycol having a molecular weight of 150 to 350 is vaporized more readily than the former, but it has the advantage of having a lower solidifying point.

The present invention is based on a discovery that a synergetic effect of both advantages (namely the effect of a liquid vehicle becoming very difficultly vaporizable without solidifying at low temperature) can be exhibited by incorporating both of these materials in combination.

The combination ratio (by weight) of a polyalkylene glycol having an average molecular weight of 150 to 350 (A component) to a polyalkylene glycol having an average molecular weight of 400 to 750 (B component) to be used in the present invention to attain the above effect may preferably be in the range from 10:1 to 1:10 (A:B), more preferably 5:1 to 1:5 (A:B).

The polyalkylene glycol to be used in the present invention may include preferably polyethylene glycol and polypropylene glycol. These may be used alone or in combination.

In the present invention, in addition to said A component and B component of polyalkylene glycols, it is also possible to use water or a non-aqueous liquid as mentioned below conventionally used in the field of recording, to which the present invention pertains, as a mixture with said components.

For example, there may be mentioned alkyl alcohols having 1 to 10 carbon atoms such as methyl alcohol, ethyl alcohol, n-propyl alcohol, isopropyl alcohol, n-butyl alcohol, sec-butyl alcohol, tert-butyl alcohol, isobutyl alcohol, pentyl alcohol, hexyl alcohol, heptyl alcohol, octyl alcohol, nonyl alcohol, decyl alcohol, benzyl alcohol and the like; aliphatic or aromatic hydrocarbon solvents as represented by cyclopentane, hexane, cyclohexane, heptane, octane, nonane, decane, undecane, dodecane, tridecane, tetralin, decalin, benzene, toluene, xylene and the like; halogenated hydrocarbon type solvents such as carbon tetrachloride, trichloroethylene, tetrachloroethane, dichlorobenzene and the like; ether type solvents such as ethyl ether, butyl ether, ethyleneglycol diethylether, ethyleneglycol monoethylether and the like; ketone type solvents such as acetone, methyl ethyl ketone, methyl propyl ketone, methyl amyl ketone, cyclohexanone, and the like; ester type solvents such as ethyl formate, methyl acetate, ethyl acetate, propyl acetate, butyl acetate, phenyl acetate, ethyleneglycol monoethylether acetate, ethyl lactate, propylene carbonate and the like; polyhydric alcohols such as ethylene glycol, diethylene glycol propylene glycol, glycerine and the like; and other various solvents, including an amide type such as dimethylformamide, and intramolecular esters of oxycarboxylic acids such as valerolactone, caprolactone, etc.

These liquids as enumerated above may be employed suitably so as to satisfy the affinity for the recording agent and the additives used as well as to satisfy the various characteristics as ink as described above. Further, if desired, two or more kinds of these solvents may be used in a mixture within the range so that an ink having desirable properties may be obtained.

The contents of the polyalkylene glycol having an average molecular weight of 150 to 350 and the polyalkylene glycol having an average molecular weight of 400 to 750 may be variable depending on other liquids employed and the scope of the intended physical property values, but they are generally in the range from 3 to 70 wt. %, preferably 5 to 50 wt. % based on the total weight of the ink.

Further, in the present invention, it has also been found that an alkanolamine may be used together with the above polyalkylene glycols in combination or further N-methyl-2-pyrrolidone or 1,3-dimethyl-2-imidazolidinone may be used in combination with these materials to obtain marked improvement in ability to dissolve various dyes.

In the present invention, the alkanolamine which can be used in combination with the aforementioned polyalkylene glycols may include monoethanolamine, diethanolamine, triethanolamine, propanolamine, isopropanolamine, diisopropanolamine, and the like. Among them, triethanolamine can give a practically very preferably combination effect. Such as alkanolamine may be generally used in an amount within the range of 1 to 40 wt. % based on the total weight of ink. In addition to these components, N-methyl-2-pyrrolidone or 1,3-dimethyl-2-imidazolidinone may also be used in combination in the present invention, preferably in an amount of 3% to 90 wt. % based on the total weight of ink.

As a recording agent, there may be employed one selected in relation to the vehicle components or additives so as to cause no precipitation, agglomeration and further no clogging of the supplying pipe or the discharging orifice in a chamber or a tank on standing for a long time.

The recording agent to be used in the present invention may be suitably selected so as to be sufficiently adapted for the recording conditions, and it is possible to use a large number of various dyes and pigments known in the art.

The dyes effectively used in the present invention are those which can satisfy the various characteristics of the formulated ink, and may generally include, for example, various azo dyes such as monoazo, polyazo, metallized azo, pyrazoloneazo, stilbeneazo, thiazoleazo type, etc; anthraquinone dyes such as anthrone and anthraquinone derivatives; indigoid dyes such as indigo and thioindigo derivatives; phthalocyanine dyes; carbonium dyes of diphenylmethane, triphenylmethane, xanthene or acridine type; quinoneimine dyes of azine, oxazine or thiazine type; methine dyes of polymethine or azomethine type; benzoquinone and naphthoquinone dyes; naphthalimide dyes; perinone dyes; and so on.

These dyes are used by being dissolved or dispersed in the liquid vehicle components as described above.

The pigments effectively used in the present invention may include a large number of inorganic pigments and organic pigments.

The quantitative relation of these recording agents may be generally 0.5 to 50% by weight based on the total weight of ink, preferably 0.5 to 40%, more preferably 1 to 30%.

Although it is preferred to use a recording agent soluble in the liquid vehicle, even a recording agent such as a pigment difficultly soluble or dispersible in the liquid vehicle may be available together with a suitable dispersing aid and by use of such a recording agent with sufficiently small particle sizes suitable for dispersion in the liquid vehicle. In this case, the particle size of the recording agent may be generally 0.01 to $3\mu$, preferably 0.01 to $2\mu$, more preferably 0.01 to $1\mu$. Further, the recording agent dispersed may have a particle size distribution which is preferably as narrow as possible.

Thus, the ink of the present invention is not only excellent in discharging stability, discharging response, uniformness of droplets, continuous recordability and image quality, but it also exhibits excellent properties in long storability of ink per se, maintenance of device or latitude in selection of the constituents.

The ink of the present invention constituted of essential components as described above possesses excellent characteristics of its own, but various additives may also be added for providing further enhanced recording characteristics. As such additives, there may be mentioned for example, viscosity controllers, surface tension controllers and specific resistivity value controllers.

The present invention is further illustrated by referring to the following Examples.

EXAMPLE 1

| | |
|---|---|
| Water Black P-200 (C.I. 35255) [Orient Chemical Industry Co.] | 5 wt. % |
| Polyethylene glycol #200 (average molecular weight = 200) | 10 wt. % |
| Polyethylene glycol #600 (average molecular weight = 600) | 20 wt. % |
| Diethylene glycol | 10 wt. % |
| Water | 55 wt. % |

The above components were thoroughly mixed in a vessel to be dissolved and filtered under pressure by means of a Teflon filter with pore sizes of $1\mu$, followed by degassing treatment using a vacuum pump, to provide an ink. With the use of said ink, in addition to the examination of ($T_1$), the items $T_2$ through $T_5$ were also examined by means of a recording device having an "on demand" type recording head (discharging orifice diameter: $50\mu$; piezooscillator driving voltage 60 V; frequency 4 KHz) which discharges ink by piezooscillator, whereby good results were obtained as shown below.

($T_1$) Long storability of ink: After ink in a sealed glass vessel was stored at $-30°$ C. and $60°$ C. for 1.5 years, no precipitation of insoluble matter was observed without any change in physical properties and tone of the ink;

($T_2$) Discharging stability: Continuous discharging was performed in atmosphere at room temperature, $5°$ C. and $40°$ C. each for 48 hours. High quality recording could be conducted constantly stably under any of these condition.

($T_3$) Discharging response: When examined for discharging response in case of intermittent discharging at the interval of 2 seconds and in case of discharging after standing for 3 months, there was no clogging at the orifice tip with stable discharging state in either case;

($T_4$) Quality of recorded image: Ink images recorded in the materials to be recorded as set forth in Table 1 were high in density and clear. After exposure to room light for 3 months, the percentage of decrease in density was less than 1%, and the image was little blurred when immersed in water for one minute.

(T$_5$) Fixing on various materials to be recorded: After 15 seconds after printing letters on the materials to be recorded as shown below, the portion of printed letters was rubbed with fingers to see the presence of slippage or blurring of image. In case of each material, the image was free from slippage or blurring, indicating good fixing characteristics.

TABLE 1

| Material to be recorded | Classification | Manufacturer |
| --- | --- | --- |
| Ginkan (trade name) | High quality paper | Sanyo Kokusaku pulp Co., Ltd. |
| Seven Star (trade name) | High quality paper | Hokuetsu Seishi Co., Ltd. |
| Hakubotan (trade name) | Medium quality paper | Honshu Paper Mfg. Co., Ltd. |
| Toyoroshi No. 4 (trade name) | Non-size paper | Toyoroshi Co., Ltd. |

EXAMPLE 2

According to the same procedure as described in Example 1, inks having the compositions shown in Table 2 were formulated and examined about T$_1$ to T$_5$ thereof. [In Table 2, the numerals indicated in the parentheses show the composition ratio, and the numerals accompanying polyethylene glycol and polypropylene glycol denote average molecular weights thereof].

As the result, each ink gave excellent characteristics similarly as in Example 1 in the tests T$_1$ to T$_5$.

Figure 4:
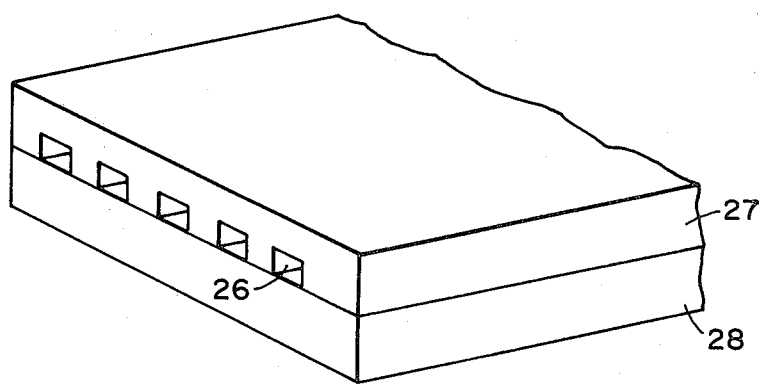
FIG. 4 is a schematic exterior slant view of a modification of the head in the form of a multi-array type of ink-jet head.

Also, by using a recording device as shown in FIG. 4 having a multi-head of "on demand" type (discharging orifice diameter: 35μ, resistance value of heat generating resistor: 150 Ω, driving voltage: 30 V, frequency: 2 KHz) in which recording was performed by generating droplets by giving heat energy to the ink in the recording head, the tests T$_2$ to T$_5$ were conducted for each ink similarly as in Example 1. As the result, excellent characteristics were exhibited in each case similarly as in Example 1.

TABLE 2

| No. | Dye(C.I. No.)[No.][Maker](wt. %) | Liquid vehicle and other components (wt. %) | |
| --- | --- | --- | --- |
| 2-1 | Miketon Fast scarlet B | Water | (20%) |
| | (C.I. 11110) | Polyethylene glycol #300 | (20%) |
| | [Mitsui Toatsu Co.] | Polypropylene glycol #400 | (5%) |
| | (3%) | Triethylene glycol monomethyl ether | (52%) |
| 2-2 | Kayalon polyester yellow 4 RE | Butyl acetate | (20%) |
| | (C.I. 26090) | Methyl ethyl ketone | (18%) |
| | [Nihon Kayaku Co.] | Polyethylene glycol #300 | (20%) |
| | (2%) | Polyethylene glycol #400 | (40%) |
| 2-3 | Acid blue black | Ethylene glycol monomethyl ether | (60%) |
| | (C.I. 20470) | Water | (17%) |
| | [Sumitomo Chemical Co.] | Polyethylene glycol #200 | (5%) |
| | (3%) | Polyethylene glycol #400 | (15%) |
| 2-4 | Aizen Cathilon yellow 3 GLH | Butyl carbitol | (30%) |
| | | Isopropyl alcohol | (12%) |
| | (C.I. 48055) | Water | (25%) |
| | [Hodogaya Chemical Co.,] Ltd. | | |
| | (8%) | Polyethylene glycol #300 | (20%) |
| | | Polyethylene glycol #600 | (5%) |
| 2-5 | Oil yellow GG | Cyclohexyl alcohol | (55%) |
| | (C.I. 11020) | Caprolactone | (30%) |
| | [Orient Chemical Co.] | Polyethylene glycol #200 | (4%) |
| | (10%) | Polypropylene glycol #400 | (1%) |
| 2-6 | Miketon Fast pink FR | Isopropyl alcohol | (40%) |
| | (C.I. 11135) | Diacetone alcohol | (36%) |
| | [Mitsui Toatsu Co.] | Polyethylene glycol #300 | (10%) |
| | (4%) | Polypropylene glycol #400 | (10%) |
| 2-7 | Aizen Cathilon pink FGH | Propylene carbonate | (20%) |
| | (C.I. 48015) | Methanol | (50%) |
| | [Hodogaya Chemical Co.] | Water | (10%) |
| | (6%) | Polyethylene glycol #200 | (2%) |
| | | Polyethylene glycol #600 | (12%) |
| 2-8 | Neozapon red GE | Ethanol | (30%) |
| | (C.I. 12716) | Ethylene glycol monomethyl ether | (10%) |
| | [B.A.S.F.] | Polyethylene glycol #200 | (37%) |
| | (3%) | Polyethylene glycol #600 | (20%) |
| 2-9 | Diacelliton Fast orange R | Caprolactone | (18%) |
| | (C.I. 11080) | n-Propyl alcohol | (20%) |
| | [Mitsubishi Chemical Co.] | Polypropylene glycol #200 | (40%) |
| | (2%) | Polypropylene glycol #750 | (20%) |
| 2-10 | Direct Fast black D | Water | (30%) |
| | (C.I. 27700) | Ethylene glycol monomethyl ether | (20%) |
| | [Nihon Kayaku Co.] | Urea | (2%) |
| | (6%) | | |
| | | Polyethylene glycol #200 | (20%) |
| | | Polyethylene glycol #600 | (22%) |
| 2-11 | Kayarus black G | Ethylene glycol monomethyl ether | (20%) |

TABLE 2-continued

| No. | Dye(C.I. No.)[No.][Maker](wt. %) | Liquid vehicle and other components (wt. %) | |
|---|---|---|---|
| | (C.I. 35255) | Ethanol | (60%) |
| | [Nihon Kayaku Co.] | Polyethylene glycol #300 | (15%) |
| | (1%) | Polyethylene glycol #600 | (4%) |
| 2-12 | Diamira golden yellow G | Triethylene glycol mono-methyl ether | (20%) |
| | (C.I. 18852) | Diacetone alcohol | (30%) |
| | [Mitsubishi Chemical Co.] | Water | (20%) |
| | (2%) | Polyethylene glycol #300 | (18%) |
| | | Polypropylene glycol #750 | (10%) |
| 2-13 | Copper phthalocyanine blue | Nikkol SL-10 (sorbitane mono-laurate)[Nikko Chemicals] | (5%) |
| | S-20 (C.I. 74160) | Ethylene glycol mono-methyl ether | (50%) |
| | [Dainichi Seika Kogyo Co.] | Polyethylene glycol #200 | (20%) |
| | (5%) | Polyethylene glycol #600 | (20%) |
| 2-14 | Aizen malachite green | Ethanol | (56%) |
| | (C.I. 42000) | Benzyl alcohol | (20%) |
| | [Hodogaya Chemical Co.] | Water | (10%) |
| | (4%) | Polyethylene glycol #200 | (5%) |
| | | Polyethylene glycol #600 | (5%) |
| 2-15 | Oil red 330 | Ethylene glycol mono-methyl ether | (25%) |
| | (C.I. 60505) | Propyl alcohol | (25%) |
| | [Orient Chemical] | Polyethylene glycol #200 | (37%) |
| | (3%) | Polypropylene glycol #400 | (10%) |

EXAMPLE 3

The ink composition was prepared in the same manner as in Example 1 to have the formulation as shown in Table 3 set forth below. There was also prepared another composition as Comparative example as shown in the same Table. Each of these compositions was filled in a felt pen, which was then left to stand with its cap off for 24 hours. The results of writing characteristics examined were shown in Table 4.

As apparently seen from these results, the ink of the present invention was particularly excellent in writing characteristic after standing.

TABLE 3

| Materials | Composition Example | Comparative example |
|---|---|---|
| Orient nigrosine BR(C.I. 50420) [Orient Chemical Co.] | 5 wt. % | 5 wt. % |
| Polyethylene glycol #200 | 15 wt. % | 30 wt. % |
| Polyethylene glycol #600 | 15 wt. % | — |
| Water | 65 wt. % | 65 wt. % |

TABLE 4

| | Example | Comparative example |
|---|---|---|
| Writing characteristic after leaving the pen to stand with cap off for 24 hours | Smooth writing | Blurred |

EXAMPLE 4

After inks having the compositions as enumerated in Table 5 were formulated in the same manner as in Example 1, each ink was examined about its characteristics $T_1$ to $T_5$ similarly as in Example 1 to obtain the following results:

($T_1$) Long storability of ink: After ink in a sealed glass vessel was stored at $-30°$ C. and 60° C. for 2 years, no precipitation of insoluble matter was observed without any change in physical properties and tone of the ink;

($T_2$) Discharging stability: Continuous discharging was performed in an atmosphere at room temperature, 5° C. and 40° C. each for 60 hours. High quality recording could be conducted constantly stably under any of these condition;

($T_3$) Discharging response: When examined for discharging response in case of intermittent discharging at the interval of 2 seconds and in case of discharging after standing for 4 months, there was no clogging at the orifice tip with stable discharging state in either case;

($T_4$) Quality of recorded image: Ink images recorded in the materials to be recorded as set forth in Table 1 were high in density and clear. After exposure to room light for 3 months, the percentage of decrease in density was less than 1%, and the image was little blurred when immersed in water for one minute.

($T_5$) Fixing on various materials to be recorded: After 15 seconds after printing letters on the materials to be recorded as set forth in Table 1, the portion of printed letters was rubbed with fingers to see the presence of slippage or blurring of image. In case of each material, the image was free from slippage or blurring, indicating good fixing characteristic.

TABLE 5

| No. | Dye(C.I. No.)[Maker](wt. %) | Liquid vehicle and other components (wt. %) | |
|---|---|---|---|
| 4-1 | Miketon Fast scarlet B | Water | (20%) |
| | (C.I. 11110) | Triethanolamine | (2%) |
| | [Mitsui Toatsu Co.] | Polyethylene glycol #300 | (5%) |
| | (3%) | Polyethylene glycol #600 | (10%) |
| | | Triethylene glycol mono- | |

TABLE 5-continued

| No. | Dye(C.I. No.)[Maker](wt. %) | Liquid vehicle and other components (wt. %) | |
|---|---|---|---|
| | | methyl ether | (60%) |
| 4-2 | Kayalon polyester yellow 4 RE (C.I. 26090) [Nihon Kayaku Co.] (2%) | Butyl acetate Methyl ethyl ketone Triethanolamine Polypropylene glycol #200 Polypropylene glycol #750 | (20%) (18%) (10%) (20%) (30%) |
| 4-3 | Acid blue black (C.I. 20470) [Sumitomo Chemical Co.] (3%) | Ethylene glycol mono-methyl ether Diethanolamine Water Polyethylene glycol #300 Polyethylene glycol #600 | (60%) (7%) (20%) (5%) (5%) |
| 4-4 | Aizen Cathilon yellow 3 GLH (C.I. 48055) [Hodogaya Chemical Co.] (8%) | Butyl carbitol Isopropyl alcohol Isopropanolamine Water Polyethylene glycol #200 Polyethylene glycol #400 | (30%) (12%) (5%) (25%) (15%) (5%) |
| 4-5 | Oil yellow GG (C.I. 11020) [Orient Chemical Co.] (10%) | Cyclohexyl alcohol Triethanolamine Polyethylene glycol #300 Polypropylene glycol #400 | (55%) (30%) (3%) (2%) |
| 4-6 | Miketon Fast pink FR (C.I. 11135) [Mitsui Toatsu Co.] (4%) | Ethanol Diacetone alcohol Triethanolamine Polyethylene glycol #200 Polyethylene glycol #600 | (40%) (36%) (10%) (8%) (2%) |
| 4-7 | Aizen Cathilon pink FGH (C.I. 48015) [Hodogaya Chemical Co.] (6%) | Propylene carbonate Methanol Triethanolamine Water Polyethylene glycol #300 Polypropylene glycol #750 | (20%) (40%) (14%) (10%) (2%) (8%) |
| 4-8 | Kayarus black (C.I. 35255) [Nihon Kayaku Co.] (3%) | Ethanol Triethanolamine Water Polyethylene glycol #200 Polyethylene glycol #400 | (30%) (10%) (27%) (10%) (20%) |
| 4-9 | Diacelliton Fast orange R (C.I. 11080) [Mitsubishi Chemcial Co.] (2%) | Caprolactone n-Propyl alcohol Diisopropanolamine Polyethylene glycol #300 Polypropylene glycol #400 | (18%) (20%) (5%) (45%) (10%) |
| 4-10 | Direct Fast black D (C.I. 27700) [Nihon Kayaku Co.] (6%) | Water Ethylene glycol mono-methyl ether Diethanolamine Polyethylene glycol #200 Polyethylene glycol #600 | (30%) (20%) (4%) (10%) (30%) |
| 4-11 | Neozapon black RE (C.I. 12195) [B.A.S.F.] (1%) | Ethylene glycol mono-methyl ether Ethanol Triethanolamine Polyethylene glycol #200 Polypropylene glycol #600 | (20%) (60%) (9%) (5%) (5%) |
| 4-12 | Diamira golden yellow G (C.I. 18852) [Mitsubishi Chemical Co.] (2%) | Triethylene glycol mono-methyl ether Diacetone alcohol Triethanolamine Water Polyethylene glycol #200 Polyethylene glycol #400 | (20%) (30%) (8%) (20%) (5%) (15%) |
| 4-13 | Copper phthalocyanine blue S-20 (C.I. 74160) [Dainichi Seika Kogyo Co.] (5%) | Nikkol SL-10 (sorbitane mono-laurate)[Nikko Chemicals] Diethanolamine Ethylene glycol mono-methyl ether Polyethylene glycol #200 Polyethylene glycol #600 | (5%) (5%) (50%) (15%) (20%) |
| 4-14 | Aizen malachite green (C.I. 42000) [Hodogaya Chemical Co.] (4%) | Ethanol Benzyl alcohol Triethanolamine Water Polyethylene glycol #200 Polyethylene glycol #600 | (36%) (20%) (10%) (10%) (15%) (5%) |
| 4-15 | Oil red 330 (C.I. 60505) [Orient Chemical] (3%) | Ethylene glycol mono-ethyl ether Propyl alcohol Monoethanolamine Polyethylene glycol #200 | (25%) (25%) (7%) (35%) |

TABLE 5-continued

| No. | Dye(C.I. No.)[Maker](wt. %) | Liquid vehicle and other components (wt. %) | |
|---|---|---|---|
| | | Polypropylene glycol #750 | (5%) |
| 4-16 | Miketon Fast scarlet B (C.I. 11110) [Mitsui Toatsu Co.] (3%) | Water | (20%) |
| | | Triethanolamine | (10%) |
| | | 1,3-Dimethyl-2-imidazolidinone | (37%) |
| | | Polyethylene glycol #200 | (10%) |
| | | Polyethylene glycol #600 | (20%) |
| 4-17 | Kayalon polyester yellow 4 RE (C.I. 26090) [Nihon Kayaku Co.] (2%) | Butyl acetate | (20%) |
| | | Methyl ethyl ketone | (18%) |
| | | Diethanolamine | (15%) |
| | | N—methyl-2-pyrrolidone | (30%) |
| | | Polypropylene glycol #400 | (5%) |
| | | Polyethylene glycol #300 | (20%) |
| 4-18 | Acid blue black (C.I. 20470) [Sumitomo Chemical Co.] (3%) | Ethylene glycol mono-methyl ether | (40%) |
| | | Triethanolamine | (20%) |
| | | Water | (17%) |
| | | 1,3-Dimethyl-2-imidazolidinone | (5%) |
| | | Polyethylene glycol #200 | (5%) |
| | | Polyethylene glycol #600 | (10%) |
| 4-19 | Aizen Cathilon yellow 3 GLH (C.I. 48055) [Hodogaya Chemical Co.] (8%) | Butyl carbitol | (30%) |
| | | Isopropyl alcohol | (12%) |
| | | Diisopropanolamine | (5%) |
| | | N—methyl-2-pyrrolidone | (10%) |
| | | Water | (25%) |
| | | Polyethylene glycol #200 | (5%) |
| | | Polypropylene glycol #750 | (5%) |
| 4-20 | Oil yellow GG (C.I. 11020) [Orient Chemical Co.] (10%) | N—methyl-2-pyrrolidone | (55%) |
| | | Triethanolamine | (30%) |
| | | Polyethylene glycol #200 | (2%) |
| | | Polyethylene glycol #600 | (3%) |
| 4-21 | Miketon Fast pink FR (C.I. 11135) [Mitsui Toatsu Co.] (4%) | N—methyl-2-pyrrolidone | (40%) |
| | | Diacetone alcohol | (36%) |
| | | Diethanolamine | (5%) |
| | | Polyethylene glycol #300 | (5%) |
| | | Polyethylene glycol #400 | (10%) |
| 4-22 | Aizen Cathilon pink FGH (C.I. 48015) [Hodogaya Chemical Co.] (6%) | 1,3-Dimethyl-2-imidazolidinone | (20%) |
| | | Methanol | (50%) |
| | | Triethanolamine | (10%) |
| | | Water | (10%) |
| | | Polyethylene glycol #200 | (1%) |
| | | Polyethylene glycol #600 | (3%) |
| 4-23 | Neozapan red GE (C.I. 12716) [B.A.S.F.] (3%) | Ethanol | (30%) |
| | | Triethanolamine | (10%) |
| | | N—methyl-2-pyrrolidone | (17%) |
| | | Polyethylene glycol #200 | (15%) |
| | | Polypropylene glycol #750 | (5%) |
| 4-24 | Diacelliton Fast orange R (C.I. 11080) [Mitsubishi Chemical Co.] (2%) | 1,3-Dimethyl-2-imidazolidinone | (38%) |
| | | n-Propyl alcohol | (20%) |
| | | Triethanolamine | (10%) |
| | | Polyethylene glycol #200 | (5%) |
| | | Polypropylene glycol #400 | (25%) |
| 4-25 | Direct Fast black D (C.I. 27700) [Nihon Kayaku Co.] (6%) | Water | (30%) |
| | | N—methyl-2-pyrrolidone | (30%) |
| | | Ethylene glycol mono-methyl ether | (20%) |
| | | Diethanolamine | (5%) |
| | | Polyethylene glycol #200 | (4%) |
| | | Polyethylene glycol #600 | (5%) |
| 4-26 | Kayarus black G (C.I. 35255) [Nihon Kayaku Co.] (1%) | 1,3-Dimethyl-2-imidazolidinone | (20%) |
| | | Triethanolamine | (2%) |
| | | Polyethylene glycol #200 | (7%) |
| | | Polyethylene glycol #600 | (10%) |
| | | Water | (60%) |
| 4-27 | Diamira golden yellow G (C.I. 18852) [Mitsubishi Chemical Co.] (2%) | Triethylene glycol mono-methyl ether | (20%) |
| | | N—methyl-2-pyrrolidone | (30%) |
| | | Triethanolamine | (8%) |
| | | Water | (20%) |
| | | Polyethylene glycol #200 | (15%) |
| | | Polypropylene glycol #400 | (5%) |
| 4-28 | Copper phthalocyanine blue S-20 (C.I. 74160) [Dainichi Seika Kogyo Co.] (5%) | Nikkol SL-10 (sorbitane mono-laurate)[Nikko Chemials] | (5%) |
| | | N—methyl-2-pyrrolidone | (70%) |
| | | Polyethylene glycol #200 | (5%) |
| | | Polyethylene glycol #600 | (10%) |

TABLE 5-continued

| No. | Dye(C.I. No.)[Maker](wt. %) | Liquid vehicle and other components (wt. %) | |
|---|---|---|---|
| 4-29 | Aizen malachite green (C.I. 42000) [Hodogaya Chemical Co.] (4%) | Triethanolamine | (5%) |
| | | 1,3-Dimethyl-2-imidazolidinone | (56%) |
| | | Benzyl alcohol | (20%) |
| | | Diisopropanolamine | (5%) |
| | | Water | (10%) |
| | | Polyethylene glycol #200 | (2%) |
| | | Polyethylene glycol #600 | (3%) |
| 4-30 | Oil red 330 (C.I. 60505) [Orient Chemical] (3%) | Ethylene glycol mono-ethyl ether | (25%) |
| | | N—methyl-2-pyrrolidone | (20%) |
| | | Propyl alcohol | (25%) |
| | | Triethanolamine | (7%) |
| | | Polyethylene glycol #200 | (15%) |
| | | Polypropylene glycol #400 | (5%) |

EXAMPLE 5

After the ink composition having the composition as shown in the Table below was formulated in the same manner as in Example 1, the ink was filled in a felt pen and the pen was left to stand with its cap off for one week. Thereafter, writing characteristics were examined and, as the result, smooth writing was possible without failure in running of ink.

| Materials | Composition |
|---|---|
| Orient nigrosine BR (C.I. 50420) [Orient Chemical Co.] | 5 wt. % |
| Polyethylene glycol #200 | 15 wt. % |
| Polyethylene glycol #600 | 15 wt. % |
| Water | 60 wt. % |
| Triethanolamine | 5 wt. % |

EXAMPLE 6

The ink composition formulated as shown in the following Table prepared in the same manner as in Example 1 was filled in a felt pen, which was then left to stand with its cap off for one week. The writing characteristics were then examined to find that smooth writing was possible without failure in running of ink.

| Materials | Composition |
|---|---|
| Orient nigrosine BR (C.I. 50420) [Orient Chemical Co.] | 5 wt. % |
| Polyethylene glycol #200 | 5 wt. % |
| Polyethylene glycol #600 | 5 wt. % |
| Water | 65 wt. % |
| Triethanolamine | 5 wt. % |
| N—methyl-2-pyrrolidone | 15 wt. % |

What we claim is:

1. A liquid recording material comprising a recording agent for forming a recording image and a liquid vehicle for dissolving or dispersing said recording agent therein,
    characterized in that a polyalkylene glycol having an average molecular weight of 150 to 350 (A component) and a polyalkylene glycol having an average molecular weight of 400 to 750 (B component) are incorporated in combination in said material, wherein the weight ratio of said A component to said B component is in the range of from 10:1 to 1:10.

2. A liquid recording material according to claim 1, wherein said polyalkylene glycol is at least one member selected from polyethylene glycol and polypropylene glycol.

3. A liquid recording material according to claim 1, wherein said A component and B component are contained in an amount in the range of from 3 wt. % to 70 wt. % based on the total weight of the liquid recording material.

4. A liquid recording material according to claim 1, wherein said A component and B component are contained in an amount in the range of from 5 wt. % to 50 wt. % based on the total weight of the liquid recording material.

5. A liquid recording material comprising a recording agent for forming a recording image and a liquid vehicle for dissolving or dispersing said recording agent therein,
    characterized in that a polyalkylene glycol having an average molecular weight of 150 to 350 (A component), a polyalkylene glycol having an average molecular weight of 400 to 750 (B component) and an alkanolamine were incorporated in combination in said material.

6. A liquid recording material according to claim 5, wherein the weight ratio of said A component to said B component is in the range of from 10:1 to 1:10.

7. A liquid recording material according to claim 5, wherein said polyalkylene glycol is at least one member selected from polyethylene glycol and polypropylene glycol.

8. A liquid recording material according to claim 5, wherein said alkanolamine is triethanolamine.

9. A liquid recording material according to claim 5, wherein said alkanolamine is contained in an amount of 1 wt. % to 40 wt. % based on the total weight of the recording material.

10. A liquid recording material according to claim 5, which further contain N-methyl-2-pyrrolidone or 1,3-dimethyl-2-imidazolidinone.

11. A liquid recording material according to claim 10, wherein N-methyl-2-pyrrolidone or 1,3-dimethyl-2-imidazolidinone is contained in an amount of 3 wt. % to 90 wt. % based on the total weight of the recording material.

12. A liquid recording material according to claim 5, wherein said A component and B component are contained in an amount in the range of from 3 wt. % to 70 wt. % based on the total weight of the recording material.

13. A liquid recording material according to claim 5, wherein said A component and said B component are contained in an amount in the range of from 5 wt. % to 50 wt. % based on the total weight of the recording material.

* * * * *

UNITED STATES PATENT AND TRADEMARK OFFICE
CERTIFICATE OF CORRECTION

PATENT NO. : 4,395,287
DATED : July 26, 1983
INVENTOR(S) : Masatsune Kobayashi, et al.

It is certified that error appears in the above—identified patent and that said Letters Patent is hereby corrected as shown below:

Column 8, in Table 2, 2nd column heading, change "Dye (C.I.No.) [No.] [Maker] (wt. %)" to -- Dye (C.I.No.) [Maker] (wt. %) --

Column 13 approximately, in 4-28 of Table 5, 1st example, 2nd column, change "Chemials" to --Chemicals --

*Signed and Sealed this*

*Twenty-second* Day of *November 1983*

[SEAL]

*Attest:*

GERALD J. MOSSINGHOFF

*Attesting Officer*  *Commissioner of Patents and Trademarks*